United States Patent [19]

Hoeschele

[11] 4,362,836

[45] Dec. 7, 1982

[54] THERMOPLASTIC COPOLYESTER ELASTOMERS MODIFIED WITH SALTS OF ALIPHATIC POLYCARBOXYLIC ACID

[75] Inventor: Guenther K. Hoeschele, Wilmington, Del.

[73] Assignee: E. I. Du Pont de Nemours and Company, Wilmington, Del.

[21] Appl. No.: 200,193

[22] Filed: Oct. 24, 1980

[51] Int. Cl.$^3$ .................. C08G 63/02; C08K 5/09
[52] U.S. Cl. .................... 524/322; 528/309
[58] Field of Search ............ 528/309; 260/31.8 XA, 260/31.8 R

[56] References Cited

U.S. PATENT DOCUMENTS

| | | | |
|---|---|---|---|
| 3,516,957 | 6/1970 | Gray et al. .................... | 260/22 |
| 3,761,450 | 9/1973 | Herwig et al. .................. | 260/75 T |
| 3,766,146 | 10/1973 | Witsiepe ........................ | 260/75 R |
| 3,957,706 | 5/1976 | Light et al. .................... | 260/22 R |
| 4,010,222 | 3/1977 | Shih et al. ..................... | 260/873 |
| 4,229,332 | 10/1980 | Kyo et al. ...................... | 260/31.8 XA |

FOREIGN PATENT DOCUMENTS 21648  4/1980  European Pat. Off. .

Primary Examiner—Joseph L. Schofer
Assistant Examiner—Peter F. Kulkosky

[57] ABSTRACT

A thermoplastic copolyester elastomer composition comprising (A) a copolyester consisting essentially of a multiplicity of long-chain ester units and short-chain ester units joined through ester linkages, said long-chain ester units being represented by the formula

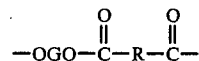

and said short-chain ester units being represented by the formula

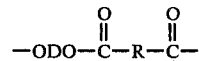

where G is a divalent radical remaining after the removal of hydroxyl groups from at least one long-chain glycol having a melting point of less than about 55° C. and a number average molecular weight of from about 400–4000, R is a divalent radical remaining after removal of carboxyl groups from at least one dicarboxylic acid having a molecular weight of less than about 300, and D is a divalent radical remaining after the removal of hydroxyl groups from at least one aliphatic diol having a molecular weight of less than about 250, with the proviso that at least about 70 mole percent of the short-chain ester units are either ethylene terephthalate units or 1,4-butylene terephthalate units, said short-chain ester units being present in an amount of 15–95% by weight of said copolyester; and (B) from about 0.1 to 10% by weight based on said copolyester of at least one alkali metal salt of an aliphatic polycarboxylic acid containing at least 20 carbon atoms and having a molecular weight of less than about 1500.

16 Claims, No Drawings

THERMOPLASTIC COPOLYESTER ELASTOMERS MODIFIED WITH SALTS OF ALIPHATIC POLYCARBOXYLIC ACID

BACKGROUND OF THE INVENTION

This invention is directed to a novel thermoplastic copolyester elastomer composition that is modified by certain alkali metal salts of aliphatic polycarboxylic acids.

Thermoplastic copolyester elastomers form a highly useful class of polymers because of their outstanding physical properties. However, it is known that copolyester elastomer compositions generally are not suitable for blow molding because of their low melt strengths. Furthermore, copolyetheresters containing ethylene terephthalate ester units are known to process poorly because of their slow hardening rate. This problem of hardening rate also exists for soft copolyetheresters containing a low percentage of butylene terephthalate ester units.

To attempt to overcome these problems, a variety of compounds have been added to the copolyester elastomers. For example, the sodium salt of a monocarboxylic acid, such as sodium stearate, can be added to the polymer to increase melt strength and also to increase hardening rate. However, the melt stability of these compositions at processing temperatures is adversely affected, as indicated by a rapid increase in melt index. It is also known to use salts of polymeric carboxylic acids, such as ethylene/methacrylate acid ionomers, as agents to improve the melt strength of copolyesters. These materials serve as nucleating agents in copolyetheresters with no detrimental effect on melt stability. However, copolyester blends with the ionomer have been found to exhibit phase separation, resulting in the formation of layers when the blend is used in high shear processing techniques such as injection molding or injection blow molding. The resulting layers separate from one another (delaminate) when such nonhomogeneous articles are flexed or stretched, for example. Obviously, such performance is generally unacceptable.

The present invention describes a copolyester elastomer composition that overcomes the above-mentioned deficiencies. The novel composition is blow moldable, melt stable, and hardens rapidly after it is shaped. It does not exhibit phase separation in high shear processing techniques including injection molding and injection blow molding.

SUMMARY OF THE INVENTION

It has now been discovered that a thermoplastic copolyester elastomer composition modified with an alkali metal salt of a polycarboxylic acid having at least 20 carbon atoms has excellent injection molding and blow molding characteristics, coupled with good melt stability at processing temperatures. More specifically, this invention is directed to a thermoplastic copolyester elastomer composition comprising (A) a copolyester consisting essentially of a multiplicity of long-chain ester units and short-chain ester units joined through ester linkages, said long-chain ester units being represented by the formula

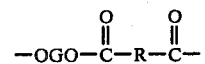

and said short-chain ester units being represented by the formula

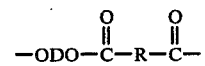

where G is a divalent radical remaining after the removal of hydroxyl groups from at least one long-chain glycol having a melting point of less than about 55° C. and a number average molecular weight of from about 400–4000, R is a divalent radical remaining after removal of carboxylic groups from at least one dicarboxylic acid having a molecular weight of less than about 300, and D is a divalent radical remaining after the removal of hydroxyl groups from at least one aliphatic diol having a molecular weight of less than about 250, with the proviso that at least about 70 mole percent of the short-chain ester units are either ethylene terephthalate units or 1,4-butylene terephthalate units, said short-chain ester units being present in an amount of 15–95% by weight of said copolyester; and (B) about 0.1 to 10% by weight based on said copolyester of at least one alkali metal salt of an aliphatic polycarboxylic acid containing at least 20 carbon atoms and having a molecular weight of less than about 1500.

The alkali metal salt of an aliphatic polycarboxylic acid may be incorporated in the copolyester by any suitable means. The salt of the polycarboxylic acid renders the copolyester elastomer injection moldable and blow moldable to form shaped articles while, at the same time, the melt stability of the copolyester is retained.

DETAILED DESCRIPTION OF PREFERRED EMBODIMENTS

The instant invention comprises novel thermoplastic copolyester elastomer compositions obtained by admixing the elastomer with at least one alkali metal salt of an aliphatic polycarboxylic acid containing at least 20 carbon atoms and having a molecular weight of less than 1500.

The thermoplastic copolyester elastomers consist essentially of repeating long-chain ester units and short-chain ester units, as previously described hereinabove. The term "long-chain ester units" refers to the reaction product of a long-chain glycol with a dicarboxylic acid. Such "long-chain ester units," which are a repeating unit in the copolyester, correspond to Formula (I) above. The long-chain glycols used to prepare the copolyesters have a number average molecular weight of about 400–4000 and a melting point less than about 55° C. Long-chain glycols that can be used for preparing polymers of this invention include the poly(alkylene oxide) glycols where the alkylene is $C_2$–$C_8$, such as poly(ethylene oxide) glycol, poly(1,2- and 1,3-propylene oxide) glycol, poly(tetramethylene oxide) glycol, poly(pentamethylene oxide) glycol, poly(octamethylene oxide) glycol, and poly(1,2-butylene oxide) glycol; random or block copolymers of ethylene oxide and 1,2-propylene oxide; and polyformals prepared by reacting formaldehyde with glycols, such as pentamethylene glycol, or mixtures of glycols, such as a mixture of tetramethylene and pentamethylene glycols. Other satisfactory long-chain polymeric glycols include polybutadiene or polyisoprene glycols, copolymers of these, and saturated hydrogenated products of these materials. Preferred long-chain glycols are poly(tetramethylene oxide) glycol having a number average molecular weight of 600–2000 and ethylene oxide capped poly (propylene oxide) glycol having a number average molecular weight of 1500–2800 and containing 15–35% ethylene oxide.

The short chain ester units are the products of the reaction of a low molecular weight diol and a dicarboxylic acid. At least 70 mole percent of the short-chain ester units are either ethylene terephthalate or 1,4-butylene terephthalate resulting from the reaction of ethylene glycol or 1,4-butanediol. Low molecular weight diols (other than ethylene glycol or 1,4-butanediol) which react to form short-chain ester units are aliphatic diols having molecular weights of less than about 250. The term aliphatic diols as used herein should be construed to include cycloaliphatic diols. Usually diols having 3–15 carbon atoms can be used. Representative diols include propylene, pentamethylene, 2,2-dimethyltrimethylene, hexamethylene, and decamethylene glycols, dihydroxy cyclohexane, cyclohexane dimethanol, etc. and mixtures thereof. Equivalent ester forming derivatives of diols are also useful, for example, ethylene oxide or ethylene carbonate can be used in place of ethylene glycol. The term "low molecular weight diols" as used herein should be construed to include such equivalent ester-forming derivatives; provided, however, that the molecular weight requirement pertains to the diol only and not to its derivatives.

Dicarboxylic acids (other than terephthalic acid) which can be reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or $SO_2$—.

Representative aliphatic and cycloaliphatic dicarboxylic acids that can be used in this invention in combination with terephthalic acid are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethyldicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis(cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids (other than terephthalic acid) which can be used include phthalic and isophthalic acids, bibenzoic acid, substituted dicarboxy compounds with two benzene nuclei such as bis(p-carboxylphenyl)methane, p-oxy-(p-carboxylphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p(β-hydroxyethoxy) benzoic acid can also be used providing an aromatic dicarboxylic acid is also present.

As acids used in addition to terephthalic acid, aromatic dicarboxylic acids are a preferred class for preparing the copolyester polymers of this invention. Among the aromatic acids, those with 8–16 carbon atoms are preferred, particularly the phenylene dicarboxylic acids, i.e., phthalic and isophthalic acids.

In order to insure that at least 70 mole percent of the short chain ester units are either ethylene terephthalate or 1,4-butylene terephthalate units, at least about 70 mole percent of the dicarboxylic acid incorporated into the polymer is terephthalic acid and at least about 70 mole percent of the low molecular weight diol incorporated into the polymer is ethylene glycol or 1,4-butanediol and the sum of the percentage of the R groups that are not 1,4-phenylene radicals and the percentage of the D groups that are not ethylene or 1,4-butylene radicals does not exceed about 30 mole percent. This means that 70% of the total R groups in Formula (I) and Formula (II) above are 1,4-phenylene radicals. At least about 70% of the D groups in Formula (II) above are ethylene radicals of 1,4-butylene radicals (derived from ethylene glycol or 1,4-butanediol). The combination of ethylene glycol and 1,4-butanediol can be used to make the copolyester, as mentioned above, provided that at least about 70 mole percent of the short chain ester units are either ethylene terephthalate or 1,4-butylene terephthalate.

The short-chain ester units constitute about 15–95 weight percent of the copolyester, preferably from about 25–85 weight percent since this results in polymers having a desirable balance of elastomeric properties and toughness. The remainder of the copolyester consists of long-chain ester units comprising about 5–85 weight percent and preferably 15–75 weight percent of the copolyester.

Preferred copolyesters for use in the compositions of this invention are those prepared from dimethyl terephthalate, 1,4-butanediol or ethylene glycol and poly(tetramethylene oxide) glycol having a number average molecular weight of about 600–2000 or ethylene oxide-capped poly(propylene oxide) glycol having a number average molecular weight of about 1500–2800 and an ethylene oxide content of 15–35% by weight. Optionally, up to about 30 mole percent of the dimethyl terephthalate in these polymers can be replaced by dimethyl phthalate or dimethyl isophthalate.

The dicarboxylic acids or their derivatives and the polymeric glycol are incorporated into the copolyester in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of diol incorporated is still the difference between moles of diacid and polymeric glycol.

The copolyesters described herein are made by a conventional ester interchange reaction which, preferably, takes place in the presence of an antioxidant. A preferred procedure involves heating the dimethyl ester of terephthalic acid with a long-chain glycol and 1,4-butanediol in a molar excess in the presence of a catalyst at about 150°–260° C. and a pressure of 0.05 to 0.5 MPa, preferably ambient pressure, while distilling off methanol formed by the ester interchange. Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight copolyester by distillation of the excess of short-chain diol. The second process stage is known as "polycondensation."

Additional ester interchange occurs during this polycondensation which serves to increase the molecular weight and to randomize the arrangement of the copolyester units. Best results are usually obtained when this final distillation or polycondensation is run at less than about 670 Pa, preferably less than about 250 Pa, and about 200°–280° C., preferably about 220°–260° C., for less than about two hours, e.g., about 0.5 to 1.5 hours. It is customary to employ a catalyst while carrying out ester interchange reactions. While a wide variety of catalysts can be employed, organic titanates such as tetrabutyl titanate used alone or in combination with magnesium acetate or calcium acetate are preferred. The catalyst should be present in the amount of about 0.005 to 2.0 percent by weight based on total reactants.

Both batch and continuous methods can be used for any stage of copolyester polymer preparation. Further polycondensation of lower molecular weight polymers can also be accomplished in the solid phase by heating divided solid polymer particles in a vacuum or in a stream of inert gas to remove liberated low molecular weight diol. This method has the advantage of reducing thermal degradation because it must be used at temperatures below the softening point of the polymer.

A detailed description of suitable copolyesters that can be used in the invention and procedures for their preparation are described in U.S. Pat. Nos. 3,023,192; 3,651,014; 3,763,109; 3,766,146; and 4,205,158, the disclosures of which are incorporated herein by reference.

The alkali metal salts of aliphatic polycarboxylic acids or mixtures thereof that are added to the copolyester elastomer contain at least 20 carbon atoms, preferably from 26–54 carbon atoms, and have a molecular weight of less than about 1500, preferably from about 450–1000. The polycarboxylic acids used to prepare the salts must contain at least 2 carboxyl groups per molecule, preferably 2 to 4 carboxyl groups. Alkali metal salts of polycarboxylic acids containing less than 20 carbon atoms are unsatisfactory because they are poor nucleating agents and have little effect on melt strength. Salts of polycarboxylic acids having molecular weights in excess of about 1500 can exhibit phase separation leading to delamination after high shear processing. Although both saturated and unsaturated polycarboxylic acids can be used to form the salt, acids substantially free of unsaturation are preferred because they have less tendency to discolor. The concentration of salt of aliphatic polycarboxylic acid that is added to modify the copolyester is from about 0.1–10% by weight, preferably 0.5–5% by weight, based on the copolyester. Below about 0.1% the effects of the salt are not significant; above about 10% the physical properties of the copolyester elastomer are adversely affected. Although any alkali metal can be used to form the salt, the preferred salts of the polycarboxylic acid are sodium and potassium salts, with sodium being especially preferred because of its lower atomic weight and its effectiveness in the present compositions.

Representative aliphatic polycarboxylic acids that can be used in this invention include octadecylsuccinic acid, octadecenylsuccinic acid, docosane dicarboxylic acid, dimer acid, and trimer acid, or mixtures thereof. By dimer acid is meant the $C_{36}$ dicarboxylic acid which is obtained by the dimerization of unsaturated $C_{18}$ fatty acids. By trimer acid is meant the $C_{54}$ tricarboxylic acid which is obtained by the trimerization of $C_{18}$ fatty acids. Any ethylenic unsaturation present in dimer and trimer acids can be removed by hydrogenation. As previously indicated, saturated polycarboxylic acids are preferred. Both dimer and trimer acids containing unsaturation or saturated by hydrogenation are readily available in commercial quantities. Availability coupled with effectiveness accounts for a preference for dimer and trimer acids and, particularly, for dimer acid. The commercial grades of dimer acid normally contain at least minor amounts of starting monocarboxylic acid and higher polymers, principally trimer acid. Likewise, commercial trimer acid normally contains traces of monocarboxylic acid and larger amounts of dimer acid. Obviously, mixtures of dimer and trimer acids can be used. It should be noted that other unsaturated monocarboxylic acids containing from 16–26 carbon atoms can also be dimerized or trimerized to form polycarboxylic acids which are useful in the present invention. These materials (with the exception noted above for acids derived from $C_{18}$ monocarboxylic acids) are generally not commercially available but are highly effective in the present invention.

The salts of the polycarboxylic acid are readily prepared by adding a concentrated aqueous solution of the selected alkali metal hydroxide to a solution of the acid in an alcohol, such as methanol, and isolating the resulting salt of the acid by evaporation of alcohol and water. Preferably, equivalent amounts of hydroxide and acid are used. Excess hydroxide should be avoided.

The present compositions can be prepared by blending alkali metal salt of the polycarboxylic acid with the molten copolyester elastomer in high shear mixing equipment such as a screw-type extruder or a Banbury mixer. The temperatures employed will normally be about 20° C. above the melting point of the copolyester.

The following ASTM methods are employed in determining the properties of the polymers prepared in the examples which follow:

| | |
|---|---|
| Modulus at 100% elongation*, $M_{100}$ | D 412 |
| Modulus at 300% elongation*, $M_{300}$ | D 412 |
| Modulus at 500% elongation*, $M_{500}$ | D 412 |
| Tensile at Break*, $T_B$ | D 412 |
| Elongation at Break*, $E_B$ | D 412 |
| Fluids Resistance | D 471 |
| Melt Index** | D 1238 |
| Split Tear*** | D 470 |

*Cross-head speed 50.8 cm/min.
**2160 g load, drying conditions: 1 hr. at 135° C./27 Pa
***Modified by use of 3.81 × 7.62 cm sample with 3.81 cm cut on the long axid of the sample. This configuration avoids "necking down" of the sample at the point of tearing. Cross-head speed 127 cm/min.

Either pure tetrabutyl titanate or the following catalyst solution of tetrabutyl titanate is used in preparing the copolyesters of the examples:

Catalyst A

To 425 parts of anhydrous 1,4-butanediol in a round bottom flask is added 23.32 parts of tetrabutyl titanate. The mixture is agitated at 50° C. for 2-3 hours until the small amount of solids originally present disappears.

Copolyester A is prepared according to the following procedure:

To a flask fitted with a distillation column and a stainless steel stirrer with a paddle cut to conform with the internal radius of the flask and positioned about 3 mm from the bottom of the flask the following starting materials are charged:

| | |
|---|---|
| dimethyl terephthalate | 802 parts |
| ethylene glycol | 537 parts |
| trimellitic anhydride | 1.82 parts |
| N,N'—trimethylene bis(3,5-di-tert.-butyl-4-hydroxy-hydrocinnamamide) | 2.5 parts |
| N,N'—hexamethylene bis(3,5-di-tert.-butyl-4-hydroxy-hydrocinnamamide) | 2.5 parts |
| tetrabutyl titanate | 2.0 parts |

The mixture is heated at such a rate that the temperature at the head of distillation column is maintained at 70° C. while methanol is removed. When substantially all of the methanol is distilled out of the reaction mixture, the head temperature rises abruptly to about 180° C. Heating and distillation continues until the temperature in the reactor reaches 230° C. The reaction mixture is allowed to cool to 185° C. and 480 parts of poly(tetramethylene oxide) glycol having a number average molecular weight of 990 is added. The reaction flask is then immersed in a 250° C. oil bath and the mixture agitated for 5 minutes under nitrogen. While maintaining an oil bath temperature of 250° C., the pressure is step-wise reduced to about 13 Pa and the distillate consisting essentially of ethylene glycol collected in a cold trap. After stirring for about 120 minutes, the polycondensation polymerization is discontinued by releasing the vacuum under nitrogen and the resulting viscous molten product is scraped from the flask in a nitrogen (water and oxygen free) atmosphere and allowed to cool. The resulting polymer has a melt index of 9.4 g/10 min. (measured at 240° C.). After shredding, the polymer is extruded at 240° C. to a 3–4 mm strand and granulated.

Copolyester B is prepared in the same reactor as described above from the following starting materials:

| | |
|---|---|
| poly(tetramethylene oxide) glycol number average molecular weight 991 | 439 parts |
| dimethyl terephthalate | 748 parts |
| 1,4-butanediol | 400 parts |
| 4,4'-bis(α,α-dimethylbenzyl)-diphenylamine | 12.0 parts |
| Catalyst A | 100 parts |

The flask is placed in an oil bath at 160° C., agitated for five minutes and then the catalyst is added. Methanol distills from the reaction mixture as the temperature is slowly raised to 250° C. over a period of one hour. When the temperature reaches 250° C., the pressure is gradually reduced to about 270 Pa within 20 minutes. The polymerization mass is agitated at 250° C./270-540 Pa for 55-90 minutes. Then the polycondensation polymerization is discontinued and the product is isolated as described above for Copolyester A. The resulting polymer has a melt index of 8.75 g/10 min. (measured at 230° C.) and an acid content of 60 meg/kg*. After shredding the polymer is extruded at 220° C. to a 3–4 mm strand and granulated.

*The carboxyl groups content is determined by dissolving the copolyester in o-cresol, adding o-dichlorobenzene, and titrating the solution with standardized ethanolic potassium hydroxide. The end point is determined visually using bromophenol blue as indicator.

Copolyester C is prepared according to the procedure given for the preparation of Copolyester B from the following starting materials:

| | |
|---|---|
| ethylene oxide (EO)-capped poly(propylene oxide) glycol (number average molecular weight 2200, EO content 26.3 wt. %) | 47.8 parts |
| dimethyl terephthalate | 44.5 parts |
| dimethyl isophthalate | 12.2 parts |
| 1,4-butanediol | 35.0 parts |
| trimellitic anhydride | 0.22 parts |
| N,N'—hexamethylenebis(3,5-di-tert.-butyl-4-hydroxy-hydrocinnamamide) | 0.16 parts |
| N,N'—trimethylenebis(3,5-di-tert.-butyl-4-hydroxy-hydrocinnamamide) | 0.16 parts |
| Bis(1,2,2,6,6-pentamethyl-4-piperidinyl)n-butyl(3,5-di-tert.-butyl-4-hydroxybenzyl)-malonate | 0.5 parts |
| tetrabutyl titanate | 0.2 parts |

*The carboxyl groups content is determined by dissolving the copolyester in o-cresol, adding o-dichlorobenzene, and titrating the solution with standardized ethanolic potassium hydroxide. The end point is determined visually using bromophenol blue as indicator.

The resulting copolyester has melt index of 11.0 g/10 min. measured at 210° C. and 78.5 mole percent of the short-chain ester units are 1,4-butylene terephthalate.

Preparation of the Sodium Salt of Dimer Acid

To a solution of 150 parts dimer acid (Hydrogenated $C_{36}$ dicarboxylic acid Empol 1010*, 3.66 milliequivalents acid/g) in 250 ml methanol 41.85 parts of 52.46% aqueous sodium hydroxide solution is added at 50° C. with agitation. After refluxing for 10 minutes the homogeneous solution is concentrated by distillation until partial crystallization takes place. The concentrate is then freed of residual solvent by heating in a vacuum oven at 100° C. until the weight of the product remains constant. The white solids are finely powdered with a mortar and pestle.

*Emery Industries, Cincinnati, Ohio

The invention is more thoroughly illustrated by the following examples in which parts and percentages are by weight unless otherwise indicated.

EXAMPLE 1

The following procedure is used for the preparation of the nucleated copolyester compositions of this example:

Copolyester A is blended for several hours by rolling first with 0.05% Sandozin D 100—a wetting agent available from Sandoz, Inc., Hanover, N.J.—and then with one of the nucleating agents listed below at room temperature. Finally, the dry-blend is mixed in a single screw extruder at 240°-250° C., extruded to a 3-4 mm strand and granulated.

The following compositions are prepared in this manner:

1A. Copolyester A containing 1.0% sodium salt of dimer acid
1B. Copolyester A containing 1.1% sodium stearate
1C. Copolyester A containing 1.0% talc (Emtal 549 Talc, C. P. Hall, Memphis, Tenn.)

Composition 1B serves as a control for a copolyester containing the sodium salt of a long chain monobasic acid as a nucleating agent, while Composition 1C represents a control polymer containing a conventional nucleating agent. As an additional control, Copolyester A without additional modification is used (Composition 1D).

The processing characteristics of all four compositions are determined by injection molding of 1.9 mm thick slabs (5.08 × 12.7 cm) using a "1 oz." Imperial Injection Molder, Model H 1-30T (Newbury Industries, Newbury, Ohio). The pertinent data are shown in Table I.

TABLE I

| | Evaluation by Injection Molding | | | |
|---|---|---|---|---|
| | Composition 1A | Control Composition 1B | Control Composition 1C | Control Composition 1D |
| Barrel Temperature, °C. | 245 | 245 | 245 | 240 |
| Nozzle Temperature, °C. | 255 | 250 | 250 | 250 |
| Ram Pressure, MPa | 44.8 | 41.4 | 41.4 | 41.4 |
| Injection Time, sec. | 20 | 20 | 20 | 20 |
| Mold Closed Time, sec. | 20 | 20 | 20 | 20 |
| Mold Temperature, °C. | 40 | 40 | 40 | 40 |
| Injection Molding Characteristics | Excellent | Excellent | Very Poor | Very Poor |
| Shore D Hardness of Slab After Injection Molding | | | | |
| 1 min. | 46 | 41 | 38 | 38 |
| 24 hrs. | 53 | 53 | 52 | 52 |

Control Compositions 1C and 1D are not processable by injection molding because of their slow hardening rate. In both cases, the injection molded slab and the sprue stick tenaciously to the mold, and it is impossible to eject the molded part. Although Control Composition 1B exhibits good injection molding characteristics, its melt stability at the processing temperature is adversely affected by the modification with sodium stearate as shown in Table II. The increase in melt index indicates that the polymer is rapidly degrading. The results shown in Table I and II clearly indicate that only Composition 1A offers the combination of good injection molding characteristics and melt stability that are important characteristics for practical thermoplastic elastomer compositions. Properties of injection molded slabs are shown in Table III.

TABLE II

| | Melt Stability at 250° C. | | |
|---|---|---|---|
| | Melt Index (g/10 min.) | | |
| Residence Time in Indexer at 250° C. (min.) | Composition 1A | Control Composition 1B | Control Composition 1D |
| 5 | 11.8 | 36.5 | 16.7 |
| 15 | 14.0 | 64.0 | 20.0 |
| 30 | 16.7 | 94.5 | 21.5 |
| 45 | 20.5 | — | 24.4 |
| 60 | 24.1 | — | 27.0 |

TABLE III

| Physical Properties of Composition 1A After Injection Molding | |
|---|---|
| $M_{100}$, MPa | 13.1 |
| $M_{300}$, MPa | 18.5 |
| $M_{500}$, MPa | 23.9 |
| $T_B$, MPa | 33.5 |
| $E_B$, % | 690 |
| Split Tear, kN/m | 52.5 |

EXAMPLE 2

Alkali metal salts of polycarboxylic acids are prepared from the following starting materials, substantially according to the procedure given above for the preparation of the sodium salt of dimer acid.

2A. dimer acid (Empol 1010, Emery Industries, Inc., Cincinnati, Ohio) and sodium hydroxide
2B. trimer acid (Empol 1041, Emery Industries, Inc., Cincinnati, Ohio) and sodium hydroxide
2C. iso-octodecylsuccinic anhydride (Humphrey Chemical Co., North Haven, Conn.) and sodium hydroxide
2D. dimer acid (Empol 1010, Emery Industries, Inc., Cincinnati, Ohio) and potassium hydroxide For control purposes sodium salts of dicarboxylic acids are prepared as above from the following starting materials:

2E. adipic acid and sodium hydroxide
2F. 1,10-decanedicarboxylic acid and sodium hydroxide 2G. 2-dodecen-1-ylsuccinic anhydride and sodium hydroxide Each of above sodium salts is mixed with Copolyester A by melt blending according to the procedure given above in Example 1. The resulting compositions are evaluated by determining their injection molding characteristics as described in Example 1. Furthermore, each composition is characterized by thermal analysis with a differential scanning calorimeter (Du Pont 990 Thermoanalyzer equipped with a Du Pont 910 DSC cell) to determine the relative crystallization kinetics by measuring the temperature of the melting point maximum $T_m$ during the heating cycle and the beginning and maximum of the crystallization exotherm ($T_{c-1}$ and $T_{c-2}$) during the cooling cycle. The analysis involves heating a polymer sample under a nitrogen atmosphere to 265° C., maintaining 265° C. for one minute followed by cooling to 100° C. at a heating/cooling rate of 20° C./min. The pertinent data are summarized in Table IV.

TABLE IV

Characterization of Nucleated Copolyester Compositions

| Composition | Sodium Salt Wt. % | Melt Index (240° C.) g/10 min. | Injection Molding Characteristics Processing | Initial Hardness Shore D | $T_m$, °C. | $T_{c-1}$, °C. | $T_{c-2}$, °C. |
|---|---|---|---|---|---|---|---|
| 2A | 1.0 | 5.3 | Excellent | 46 | 229 | 217 | 192 |
| 2B | 1.0 | 5.9 | Excellent | 45 | 226 | 217 | 190 |
| 2C | 1.0 | 8.25 | Good | 45 | 227 | 217 | 178 |
| 2D | 1.1 | 7.8 | Good | 45 | 228 | 205 | 184 |
| Control 2E | 0.5 | 12.8 | Very Poor* | 25 | 229 | 177 | 166 |
| Control 2F | 1.1 | 12.0 | Very Poor* | 38/48** | 229 | 197 | 177 |
| Control 2G | 1.0 | 11.8 | Very Poor* | 25/38** | 227 | 182 | 165 |

*Severe sticking of injection molded slab to mold, no ejection
**Non-uniform hardness (softer at the corners of slab, harder at the center).

The superior performance of the nucleating agents of this invention in comparison to the effectiveness with other salts is clearly evident from the injection molding results and thermo-analytical data shown in Table IV.

EXAMPLE 3

In this example the preparation of blow moldable copolyester composition having superior properties compared to prior art compositions is described.

Copolyester B is mixed with 3% sodium salt of dimer acid by melt blending at 260°–270° C. in a single screw extruder according to the procedure given in Example 1 (Composition 3A).

For control purposes the sodium salt of an ethylene (89%)/methacrylic acid (11%) copolymer containing 75% neutralized carboxylic acid groups is melt blended with Copolyester B at a 10% level as described above (Composition 3B). This composition is representative of the blow moldable copolyester blends disclosed in U.S. Pat. No. 4,010,222.

The two compositions are characterized by measuring the melt index, melt tension and high temperature grease resistance after injection molding at 230°–240° C. The results are summarized in Table V.

TABLE V

Physical Properties of Blow Moldable Copolyester Compositions

| | Composition 3A | Control Composition 3B |
|---|---|---|
| Melt Index, g/10 min. (measured at 230° C.) | 1.1 | 0.6 |
| Melt Tension*, g (measured at 225° C.) | 3.6 | 4.2 |

TABLE V-continued

Physical Properties of Blow Moldable Copolyester Compositions

| | Composition 3A | Control Composition 3B |
|---|---|---|
| Physical Properties after Grease Aging at 135° C. for 7 Days** % Retention of Original Properties | | |
| $T_B$ | 76 | delamination |
| $E_B$ | 85 | of test specimen |
| % Volume Increase | 5.3 | |

*Melt tension is determined by drawing the extrudate of a predried polymer at a constant rate of 10 ft./min. from an Instron capillary rheometer operated at a temperature 30° C. above the melting point of the copolyester and using a die having an outside diameter of 0.04 inch, length-to-diameter ratio of 4 and 90° entrance angle with Instron cross head speed of 0.2 in/min. (The polymer is predried for 1 hour at 100° C. in a vacuum oven before testing.)
**Aged by immersion in Amoco Rykon EP No. 2 grease.

It is evident from the data shown in Table V that both compositions possess high melt viscosity and melt tension which makes them particularly suitable for processing by blow molding and film extrusion techniques. However, processing of Control Composition 3B by high shear injection molding techniques causes phase separation into layers which in turn leads to delamination of the injection molded part during aging at elevated temperatures. This behavior severely limits the utility of these blends in injection molding and injection blow molding.

EXAMPLE 4

Copolyester C (350 parts) and finely powdered sodium salt of dimer acid (10 parts) are melt blended in an extruder at 210° C. as described above in Example 1.

As a control polymer, Copolyester C without modification is used.

Both compositions are characterized by thermal analysis as described above in Example 2 except that the maximum temperature during the heating cycle is 250° C. The pertinent results are shown in Table VI.

TABLE VI

Thermal Analysis of Copolyester Compositions

| | Copolyester of This Sample | Control |
|---|---|---|
| $T_m$, °C. | 174 | 174 |
| $T_{c-1}$, °C. | 162 | 147 |
| $T_{c-2}$, °C. | 148 | 106 |

Above results clearly reflect the superior crystallization characteristics of nucleated copolyester composition which is important for short cycle injection molding operations.

I claim:

1. A thermoplastic copolyester elastomer composition comprising (A) a copolyester consisting essentially of a multiplicity of long-chain ester units and short-chain ester units joined through ester linkages, said long-chain ester units being represented by the formula

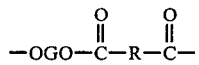

and said short-chain ester units being represented by the formula

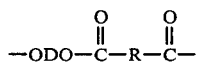

where G is a divalent radical remaining after the removal of hydroxyl groups from at least one long-chain glycol having a melting point of less than about 55° C. and a number average molecular weight of from about 400–4000, R is a divalent radical remaining after removal of carboxyl groups from at least one dicarboxylic acid having a molecular weight of less than about 300, and D is a divalent radical remaining after the removal of hydroxyl groups from at least one aliphatic diol having a molecular weight of less than about 250, with the proviso that at least about 70 mole percent of the short-chain ester units are either ethylene terephthalate units or 1,4-butylene terephthalate units, said short-chain ester units being present in an amount of 15–95% by weight of said copolyester; and (B) from about 0.1 to 10% by weight based on said copolyester of at least one alkali metal salt of an aliphatic polycarboxylic acid containing at least 20 carbon atoms and having a molecular weight of less than about 1500.

2. A composition of claim 1 where the salt of the aliphatic polycarboxylic acid contains 26–54 carbon atoms.

3. A composition of claims 1 or 2 where the salt of the aliphatic polycarboxylic acid is derived from a polycarboxylic acid containing 2 to 4 carboxyl groups per molecule.

4. A composition of claim 1 where the salt of the aliphatic polycarboxylic acid is derived from a polycarboxylic acid substantially free of unsaturation.

5. A composition of claim 1 where the salt of the aliphatic polycarboxylic acid is derived from dimer acid.

6. A composition of claim 1 where the salt of the aliphatic polycarboxylic acid is derived from trimer acid.

7. A composition of claims 1, 5, or 6 where the salt of the aliphatic polycarboxylic acid is derived from sodium or potassium.

8. A composition of claims 1, 5, or 6 modified with from about 0.5–5% by weight based on said copolyester of an alkali metal salt of an aliphatic polycarboxylic acid.

9. A composition of claim 1 where the short-chain ester units are present in an amount of from about 25–85% by weight of said copolyester.

10. A composition of claim 1 where the short-chain ester units are derived from terephthalic acid and 1,4-butanediol or ethylene glycol.

11. A composition of claim 1 where the long-chain ester units are derived from terephthalic acid and poly(tetramethylene oxide) glycol having a number average molecular weight of 600–2000 or ethylene oxide-capped poly(propylene oxide) glycol having a number average molecular weight of 1500–2800 and an ethylene oxide content of 15–35% by weight.

12. A composition of claim 1 where the molecular weight of the salt of the aliphatic polycarboxylic acid is from about 450–1000.

13. A composition of claim 11 wherein the aliphatic polycarboxylic acid is derived from a polycarboxylic acid containing 2 to 4 carboxyl groups per molecule.

14. A composition of claim 11 wherein the salt of the aliphatic polycarboxylic acid is derived from a polycarboxylic acid substantially free of unsaturation.

15. A composition of claim 11 wherein the salt of the aliphatic polycarboxylic acid is derived from dimer acid.

16. A composition of claims 13, 14 or 15 wherein the salt of the aliphatic polycarboxylic acid is derived from sodium or potassium.

* * * * *